Nov. 27, 1951  C. H. MOFFETT  2,576,628
LOAD BRAKE FOR HOISTS
Filed April 18, 1947
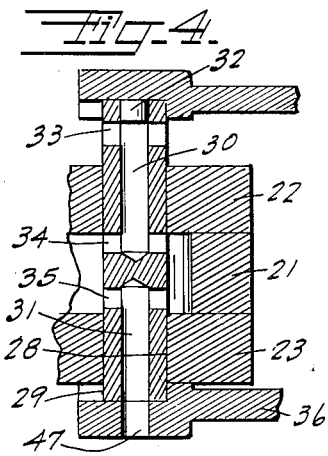
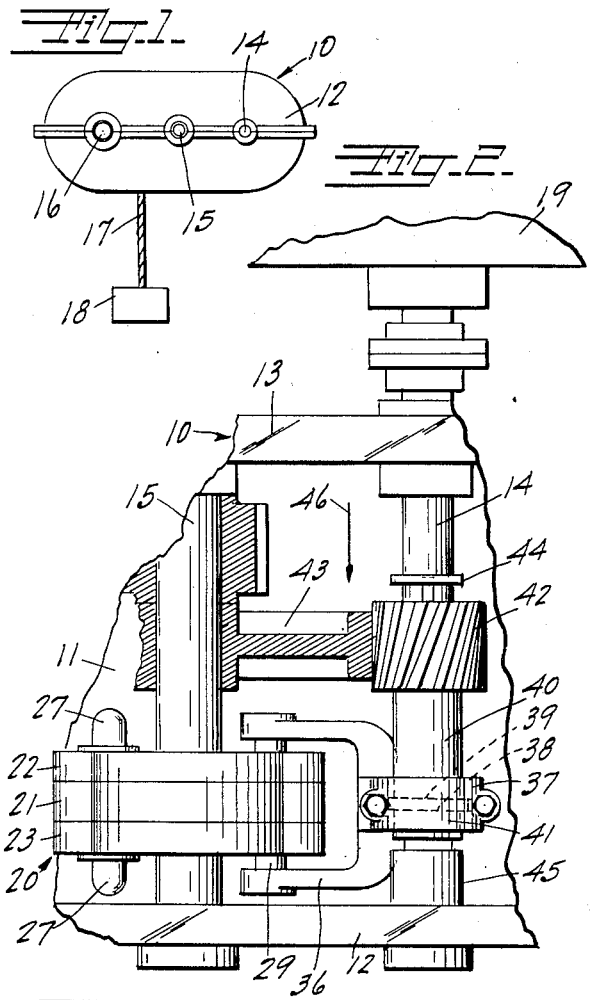
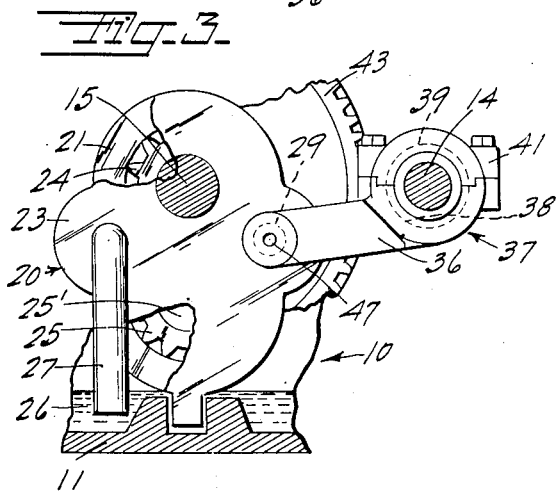
Inventor
Clyde H. Moffett
By Philip A. Friedell
Attorney Patented Nov. 27, 1951

2,576,628

UNITED STATES PATENT OFFICE 2,576,628

LOAD BRAKE FOR HOISTS

Clyde H. Moffett, Albany, Calif., assignor to Moffett Manufacturing Company, Albany, Calif.

Application April 18, 1947, Serial No. 742,326

3 Claims. (Cl. 188—92)

This invention relates to improvements in brakes for checking the load against over-running the motor of conventional drum hoists and is equally applicable to winches and similar devices.

The conventional hoist is provided with a brake for holding the load at any desired point and with another brake to slow down the hoist when lowering a load and which brake is usually of the friction type. These friction type brakes develop a great deal of heat in use and this heat is transmitted to the entire unit and with continuous use this heat may become great enough to cause detrimental effects, such as the carbonizing of the oil and grease which in turn may cause cutting or scoring of the bearings and the teeth of the gears. The brake also wears quite rapidly, requiring relatively frequent replacements and repairs. The friction type brake is therefore somewhat undependable, since any wear changes the braking power because the braking power is dependent upon a shift set up through overrunning of the gears for engagement of the braking surfaces.

My invention overcomes all of the above objectionable and undesirable features, is positive in action, not subject to other than normal wear, relatively non-heating, is positively controlled by the relative reverse urgences of the gears, and is controlled for braking in conformity with the actual load on the gears in the respective directions.

There are no friction surfaces to wear and relatively no power is used for operation, the brake operates freely when there is no over-running load on the drive pinion and comes into operation as soon as a reverse effort is transmitted to this pinion with the braking effort substantially equal to the over-running effort. Therefore in lowering a load the speed of lowering will be practically the same irrespective of the load, considering identical motor speeds, because as soon as the load takes all load off the motor and starts over-running the brake immediately comes into action increasing its braking power as the over-run effort is increased.

The objects and advantages of the invention are as follows:

First, to provide a load brake for hoists which will run freely when the driving means carries the load and brake the load when the effort of the load is greater than that of the motor.

Second, to provide a brake as outlined which is of the simplest possible construction, simple in operation, and positive in action, and which will brake the load in conformity with the over-running effort transmitted by the load.

Third, to provide a brake as outlined which includes a fluid pump and valve means controlled by the direction and intensity of the pressure between cooperating gear teeth of the hoist drive.

Fourth, to provide a brake as outlined which is controlled through the axial thrust set up in opposite directions between mating spiral gears or the like.

Fifth, to provide a brake as outlined which is substantially free from wear, easily installed and requiring an absolute minimum of space.

In describing the invention reference will be made to the accompanying drawings in which:

Fig. 1 is a side elevation drawn to a reduced size of a conventional hoist of a type to which the invention is applicable.

Fig. 2 is a top plan view of the invention with cooperating parts shown partly in section.

Fig. 3 is a side elevation of the invention, with the side wall of the hoist casing removed and the base shown in section.

Fig. 4 is an enlarged sectional top plan view of the control valve, showing the valve fully open.

Fig. 5 is another view similar to Fig. 4 except with the valve fully closed.

Fig. 6 shows a modification of the control means.

The conventional hoist includes a casing 10 including a bottom 11 and side walls 12 and 13 and a gear reduction including a drive shaft 14, intermediate shaft or shafts 15 and drum shaft 16 on which the chain or cable 17 is wound and unwound for raising and lowering loads 18, and having a power drive such as a reversible motor 19. The unit also includes a manually or an automatically controlled brake such as the conventional solenoid type (not shown) for stopping the load at any point. Some conventional hoists also includes an over-running brake which is usually of a friction type which type is not too dependable because of loss of friction through wear and requiring regular inspection and frequent repairs or renewals, and which type also develops a great deal of heat.

The invention consists in providing a unit which does not include friction elements for braking, one which is of the fluid type and which is controlled by the direction and intensity of thrust or urgence on the drive pinion and therefore entirely automatic in action and being free of braking effect when a load is being raised, and consists of a fluid pump 20 illustrated as of the gear type including a casing consisting of a body 21 and covers 22 and 23, and intermeshing gears 24 and 25 with gear 24 mounted on one of the intermediate shafts 15 preferably the first intermediate shaft which coincidently functions as a support for the first intermediate gear and as the drive shaft for the pump, the other gear 25 of the pump being mounted on a shaft 25' which is supported in bearings formed from the insides of the covers 22 and 23 and being sealed thereby.

This pump is provided with an intake which is in communication with the fluid 26 through suitable means such as the tubes 27 and also has a discharge which consists of a through passage 28 in which the control valve 29 is slidable.

The control valve 29 is bored axially from each end as indicated at 30 and 31 and one of the bores is plugged at its outer end as indicated at 32 and this plugged bore is provided with diametric communicating bores respectively 33 just below the plug and 34 at the bottom of the bore, while the other bore 31 is left open and has only the diametric communicating bores 35 near the inner end, the diametric bores 33 and 35 being located to simultaneously respectively communicate exteriorly and interiorly of the pump with the diametric bore 34 being in constant communication with the interior of the pump, the bores 33 and 35 being sealed in one position by the walls of the bore 28 as indicated in Fig. 5 and completely open in the other position as shown in Fig. 4, with the diametric bores in the intermediate position of half open in the position shown in Fig. 2.

This valve is controlled through a shifter fork 36 which has valve-end receiving recesses which are open frontally to permit the fork to be slipped into position spanning the ends of the valve, for convenience in assembling, and the fork terminates in a head 37 which has an internal bore 38 to fit about a collar 39 formed on the drive pinion hub extension 40, and being secured by means of a suitable cap 41 with the hub extension and collar rotatable within the bearing formed by the head 37 and cap 41. Thus any axial movement of the hub extension will carry the shifter with it and coincidently shift the control valve. The shifter mechanism may be manually operated for manually operated hoists, or may be automatically operated by any means which will cause a relative axial shift of some part of the reduction unit such as having the drive pinion threadedly mounted on the drive shaft so that the pinion will creep along the shaft in opposite directions in conformity with opposite urgences, as indicated in Fig. 6.

The drive pinion 42 and its mating gear 43 may be, as shown, of the helical or spiral type with the angle of the teeth great enough to produce a positive axial thrust. The gear 43 with its shaft is fixed against axial movement while the pinion 42 with its hub extension is axially movable on the shaft but limited by the collar 44 and bearing hub 45 to a degree just sufficient to move the valve from one extreme position to the other as indicated by Figs. 4 and 5.

In operation, when a load is being lifted, the pump is driven in reverse, the thrust is transmitted from the drive pinion 42 to the gear 43 and this thrust causes the pinion to slide in the direction of the arrow 46 carrying the shifter with it and moving the valve to the position shown in Fig. 5. Since no fluid can enter the discharge, any fluid in the pump will be pumped out of the intakes 27 and the pump will be empty and operating without noticeable resistance and therefore adding no noticeable load on the motor 19.

If the motor should be stopped during a lifting operation and the holding brake should become inoperative, the pump would be operated to pump fluid 26, the thrust of the gear 43 would hold the pinion in the same position, with the valve remaining closed as shown in Fig. 5, locking the shaft 15 against rotation thus holding the load. In fact the conventional holding brake could be dispensed with as this brake will hold the load whenever the motor becomes inoperative or is stopped.

If the load is being lowered and its weight is great enough to drive the pinion 42 at a speed in excess of that of the motor, this over-running action adjusts the valve in degree conforming with the relative over-run thrust of the gear 43 on the pinion 42 because the first tendency of the over-run would be to shift the valve clear over and block the gear but as soon as it has moved sufficiently to allow the motor to pick up the load the valve would be stopped at some intermediate point depending on where the load was transferred back to the motor. The balanced position of the valve is therefore governed by the intensity of the load, and in any case if the motor should stop the weight would be simultaneously stopped and held in the instant position because the valve would be moved to the position shown in Fig. 5 with all of the discharge ports blocked, locking the shaft 15 against rotation.

I claim:

1. A fluid brake comprising a gear pump having covers and a discharge chamber; a bearing bore formed through the covers and opening into said discharge chamber; a valve comprising a cylindrical member axially slidable in said bearing bore and having a length greater than the distance through said covers and having an axial bore formed in each end and terminating adjacent the longitudinal center in closely spaced relation providing a closure therebetween with one bore plugged at the outer end and the other bore open at its outer end, and with said one bore having a communicating diametric passage closed by the wall of the bearing bore when the valve is in one axially movable position and open for discharge through said one bore when the valve is in another position, and having a second communicating diametric passage continuously open to the interior of the pump; and the other end having a communicating diametric passage closed by the wall of the bore when the valve is in one position and open to the interior of the pump when in the other position; whereby when the valve is in one position the discharge chamber is sealed against intake or discharge of fluid, and when in the other position, the chamber is open for intake or discharge of fluid.

2. Breaking means comprising; a gear pump having a discharge chamber and end walls; a valve bearing passage formed through said end walls and opening into said discharge chamber; a valve member slidably fitting said valve bearing passage and having a length greater than the distance through said end walls, and means for shifting said valve member axially within said passage; an axial passage provided in each end of said valve member and terminating in spaced relation to the longitudinal center; two diametric passages communicating with one of said axial passages in longitudinally spaced relation with one diametric passage continuously open to the discharge chamber and the other open to atmosphere when the valve is in one position and closed by the wall of the bearing passage when in the other position, and with said one of said axial passages closed at its outer end; and one diametric passage in communication with the other of said axial passages and closed by the wall of the valve bearing passage when the valve is in one position and open to the interior of the discharge chamber when in the other position, whereby the degree of admission or discharge of fluid to and from the discharge chamber is controlled by the degree and direction of axial shift of the valve.

3. A valve for a pump having a fluid chamber and end walls comprising; a bearing passage formed through the end walls and communicating with the fluid chamber; a valve member slidable in said bearing passage and having a length greater than the distance through said end walls, and means for slidably adjusting said valve member; spaced diametric passages communicating with a longitudinal passage provided in one end of said valve member with one diametric passage in continuous communication with said fluid chamber and the other diametric passage closed by the wall of the bearing passage in one end wall when the valve is in one slidably adjusted position and open to the exterior of the pump when in the other position, and a third diametric passage in communication with a longitudinal passage provided in the other end of said valve member and closed by the wall of said bearing passage in said one slidably adjusted position and open to the exterior of the pump when in the other position, whereby longitudinal shifting of the valve member controls the degree of fluid flow to and from the fluid chamber.

CLYDE H. MOFFETT.

REFERENCES CITED

The following references are of record in the file of this patent:

UNITED STATES PATENTS

| Number | Name | Date |
| --- | --- | --- |
| 152,718 | Wyman | June 30, 1874 |
| 967,518 | Hartmann | Aug. 16, 1910 |
| 1,106,588 | Schnitzler et al. | Aug. 11, 1914 |
| 1,517,285 | Fischedick et al. | Dec. 2, 1924 |
| 1,586,210 | Miller | May 25, 1926 |
| 1,966,246 | Jackson | July 10, 1934 |